(12) United States Patent
Hieb

(10) Patent No.: US 9,947,312 B1
(45) Date of Patent: Apr. 17, 2018

(54) SYSTEMS AND METHODS FOR DELIVERING TEXT-BASED MESSAGING VIA HOME AUTOMATION DEVICES

(71) Applicant: Echostar Technologies L.L.C., Englewood, CO (US)

(72) Inventor: Eric Hieb, Parker, CO (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 0 days.

(21) Appl. No.: 15/393,740

(22) Filed: Dec. 29, 2016

(51) Int. Cl.
| | |
|---|---|
| *G10L 13/08* | (2013.01) |
| *G10L 15/02* | (2006.01) |
| *G10L 13/047* | (2013.01) |
| *G10L 13/04* | (2013.01) |
| *H04N 21/41* | (2011.01) |
| *H04N 21/61* | (2011.01) |

(52) U.S. Cl.
CPC .......... *G10L 13/08* (2013.01); *G10L 13/043* (2013.01); *G10L 13/047* (2013.01); *G10L 15/02* (2013.01); *H04N 21/4126* (2013.01); *H04N 21/6143* (2013.01); *H04N 21/6193* (2013.01)

(58) Field of Classification Search
USPC .......................................... 704/258–269, 270
See application file for complete search history.

(56) References Cited

U.S. PATENT DOCUMENTS

| | | | |
|---|---|---|---|
| 7,551,071 B2* | 6/2009 | Bennett, III | H04L 12/2803 340/12.54 |
| 9,253,317 B2 | 2/2016 | Nguyen et al. | |
| 9,275,642 B2 | 3/2016 | Abdossalami et al. | |
| 9,536,527 B1* | 1/2017 | Carlson | G10L 15/22 |
| 2015/0073805 A1* | 3/2015 | Stern | G10L 13/07 704/260 |
| 2015/0244665 A1 | 8/2015 | Choi et al. | |
| 2016/0028670 A1 | 1/2016 | Lott et al. | |
| 2017/0236514 A1* | 8/2017 | Nelson | G10L 15/22 704/257 |

OTHER PUBLICATIONS

Riley, Mike, "Programming Your Home, Automate with Arduino, Android, and Your Computer," The Pragmatic Programmers, 2012, 229 pages.

* cited by examiner

*Primary Examiner* — Abul Azad
(74) *Attorney, Agent, or Firm* — Kilpatrick Townsend & Stockton LLP

(57) ABSTRACT

Various arrangements for providing a text-based message to a recipient as synthesized speech are provided. A home automation host server system may receive a text-based message addressed to a designated vocalization destination from an electronic address associated with a sender. The text-based message may be filtered to determine that the text-based message is eligible for output as synthesized speech. A home automation device linked with the designated vocalization destination may be identified. Data corresponding to the text-based message addressed to the designated vocalization destination may be transmitted to the home automation device. The home automation device may be caused to output at least a portion of the text-based message as synthesized speech.

19 Claims, 9 Drawing Sheets

SYSTEMS AND METHODS FOR DELIVERING TEXT-BASED MESSAGING VIA HOME AUTOMATION DEVICES

BACKGROUND

Texting and phone calls can be preferable forms of communication when a recipient is carrying or near his mobile device and is in a position to view the device's screen or answer a call. However, frequently, when a message recipient is at home or another trusted location, such as in the recipient's vehicle or office, the recipient may place his device down and may not feel or hear it vibrate, hear it ring, or be in a position to view the device's screen. Despite the relative inaccessibility of the device, the recipient may desire at least certain message senders to be able to communicate with the recipient.

SUMMARY

Various arrangements for providing a text-based message to a recipient as synthesized speech are presented, including methods, systems, devices, and processor-readable instructions. In various embodiments, a text-based message addressed to a designated vocalization destination may be received from an electronic address associated with a sender. The text-based message may be filtered to determine that the text-based message is eligible for output as synthesized speech. A home automation device linked with the designated vocalization destination may be determined. Data corresponding to the text-based message addressed to the designated vocalization destination may be transmitted to the home automation device. The home automation device may be caused to output, via a speaker of the home automation device, at least a portion of the text-based message as synthesized speech.

Embodiments of such arrangements may include one or more of the following features: It may be determined that the synthesized speech of the text-based message was heard by the recipient. In response to determining that the synthesized speech of the text-based message was heard by the recipient, an acknowledgment of the text-based message having been heard may be transmitted to the sender's device. Determining that the synthesized speech of the text-based message was heard by the recipient may be based on the recipient providing a vocalized acknowledgment of the text-based message having been heard to the home automation device. Determining that the synthesized speech of the text-based message was heard by the recipient may be based on motion having been detected by the home automation device within a time period of the text-based message having been output as the synthesized speech. It may be determined that the synthesized speech of the text-based message was not heard. In response to determining that the synthesized speech of the text-based message was not heard by the recipient, an acknowledgment of the text-based message not having been heard may be transmitted to the sender's device. Determining that the synthesized speech of the text-based message was not heard may be based on no vocalized acknowledgment of the text-based message having been heard being provided to the home automation device. Determining that the synthesized speech of the text-based message was not heard may be based on no motion having been detected by the home automation device within a time period of the text-based message having been output as the synthesized speech. Determining the home automation device linked with the designated vocalization destination may include: determining a plurality of home automation devices linked with the designated vocalization destination; and selecting the home automation device from the plurality of home automation devices based on motion being detected by the home automation device. Determining the home automation device linked with the designated vocalization destination may include determining a plurality of home automation devices linked with the designated vocalization destination. Multiple home automation devices of the plurality of home automation devices may be caused to output at least the portion of the text-based message as synthesized speech.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Many locations, such as a homes and offices, now have home automation devices installed. Such home automation devices can allow a person to vocally interact with the device. For instance, a user of the home automation device may be able to speak a key phrase to trigger activation of the device. Once activated, the user may be able to pose a question or state a command to the home automation device, which is then interpreted, searched or executed, and then a synthesized vocal response may be output.

If a sender wishes to have a message announced in a region of a recipient, the sender may be able to send a text-based message to a designated messaging account (which may have an email address or text messaging address). Such a designated email or text messaging address is associated with a home automation device and, if the text-based message meets certain filtering qualifications (e.g., length, content, subject line), the text-based message is read aloud by the home automation device and heard by the recipient without the recipient having to physically interact with the recipient's mobile device or the home automation device.

A messaging account may be cloud-based and may be linked with the designated email or text messaging address. When a message is received by the host server system, initial filtering may be performed on the message, including determining whether the message originates from a known or otherwise authorized address or sender. Additional filtering may also be performed, such as a determination of whether the recipient has disabled auditory home automation device message output.

If the received message qualifies for output after filtering, the message may be transmitted to one or more home automation devices associated with the messaging account. If multiple home automation devices are associated with the messaging account, a home automation device may be selected that is closest to the recipient and the message may be vocalized by the selected home automation device. Therefore, if the recipient is near the home automation device, the recipient will likely hear the message. The home automation device may assess whether the recipient heard the message by determining whether motion is present in the vicinity of the home automation device or by asking if the recipient received the message, such as by outputting "Did you hear that?" and receiving an affirmation in response. If the message is output by the home automation device and is determined to be received, the sender may receive a confirmation that his message has been output and heard. Conversely, if the home automation device assesses that the message was not likely heard (e.g., no movement in the area of the home automation device, or the recipient does not acknowledge hearing the message), the home automation device may provide a notification to the sender indicating that the message was output, but not likely heard.

Figure 1:
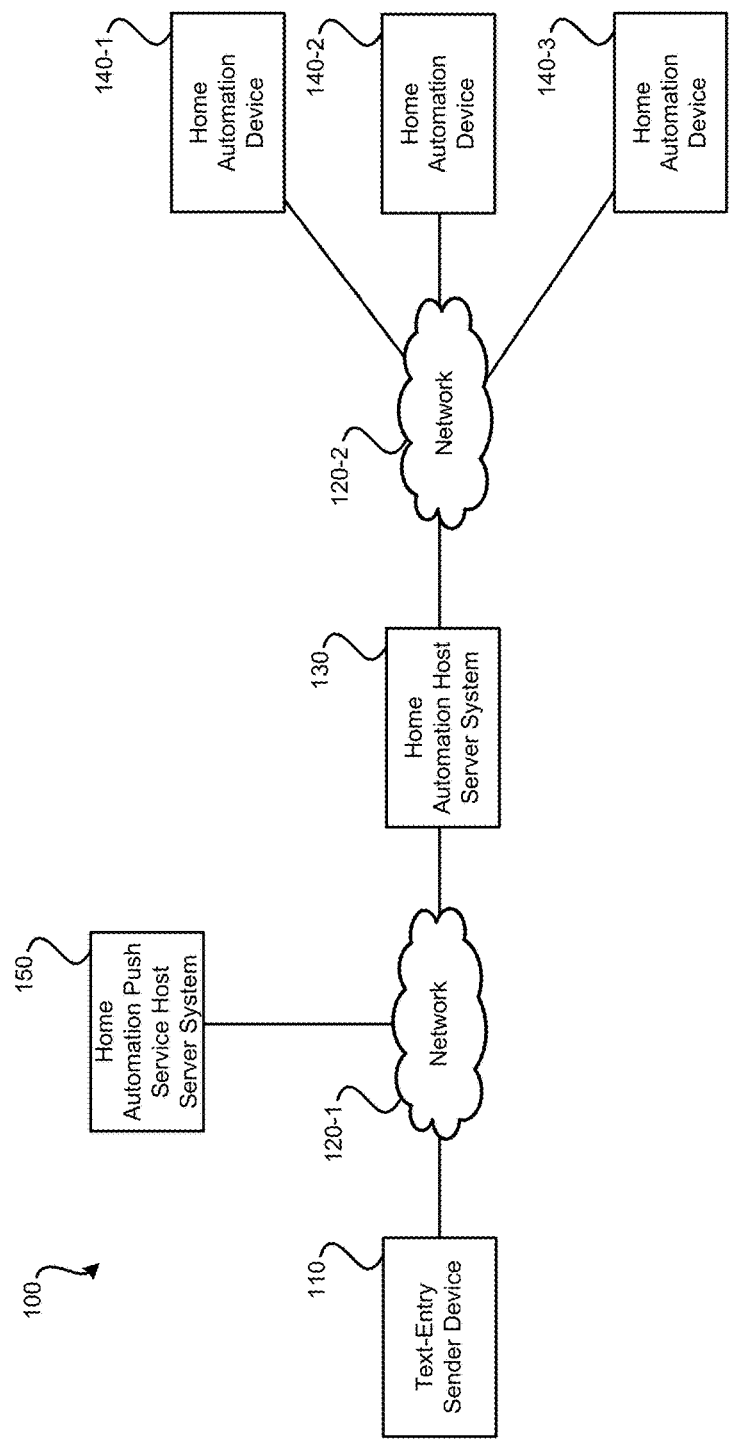
FIG. 1 illustrates an embodiment of a system for delivering text-based messages by outputting synthesized speech via a home automation device.

Further detail regarding the above embodiments is provided in relation to the figures. FIG. 1 illustrates an embodiment of a system 100 for delivering text-based messages by outputting synthesized speech via a home automation device. System 100 may include: text-entry sender device 110, one or more networks 120 (120-1, 120-2), home automation host server system 130, home automation device 140, and home automation push service host server system 150.

A person who is sending a text-based message (referred to as the "sender") may desire the text-based message to be output as speech in a vicinity of an intended recipient (referred to as the "recipient") such that the recipient likely hears the synthesized speech. The sender may compose the text-based message (e.g., by typing or dictating) using text-entry sender device 110. Text-entry sender device 110 may be a smartphone, cellular phone, tablet computer, laptop computer, desktop computer, voice-enabled home automation device (which could convert speech to text), or various other forms of computerized devices that allows a user to compose a text-based message for transmission. The text-based message may be composed in the form of an (SMS) text message, an email, a social media direct message (DM), or social media post. The text-based message may include multiple fields, including: a destination address, a subject, and/or a body.

Rather than the message being addressed to an intended recipient, the message may be addressed to a designated address associated with where the sender wants the text-based message output as speech. For example, if a sender knows his wife is at home, he may desire that the text-based message be output as speech within the home. Depending on the type of text-based message created for transmission, the message may be addressed differently. A phone number, email address, or social media account may be linked with one or more home automation devices that are located in one or more locations (e.g., all the home automation devices in a home, all the home automation devices at a home and a vacation home, all the devices in a home and car). In other embodiments, an address may be associated with a particular recipient and this recipient may associate particular home automation devices with the address. Therefore, the recipient could specify particular home automation devices through which synthesized speech messages are to be output. In some embodiments, a personal email address or personal SMS text messaging address (e.g., mobile phone number) of the recipient may have its messages filtered for output is speech via a home automation device. For instance, if a keyword or key phrases are present in a subject of a message, this may serve as a trigger for the message to be output as synthesized speech.

Text-entry sender device 110 may transmit the message to home automation host server system 130. Home automation host server system 130 may analyze the received message to determine a recipient or one or more home automation devices which are intended to receive the message. Home automation host server system 130 may perform filtering to determine if the message does or does not qualify for output as synthesized speech. If it does, information corresponding to the message may be transmitted to one or more home automation devices. If not, home automation host server system 130 may redirect the message or otherwise prevent the message from being output by the one or more home automation devices as synthesized speech. Home automation host server system 130 is detailed in relation to FIG. 4.

Network 120-1 may be used to communicate between text-entry sender device 110 and home automation host server system 130. Network 120-1 may represent one or more public and/or private networks, such as the Internet and/or a wireless service provider's cellular network. Network 120-2 may represent the same or at least some of the same networks as network 120-1. For instance, home automation host server system 130 may use the Internet to deliver information relating to a text-based message to be output as synthesized speech to home automation devices 140. In other embodiments, network 120-2 may be a distinct network from the one or more networks 120-1. For example, network 120-2 may be a television service provider's network such as detailed in relation to FIG. 7.

One or more home automation devices 140, which is illustrated as home automation devices 140-1, 140-2, and 140-3 may receive information from home automation host server system 130 which causes one or more of the home automation devices 140 to output speech based on the initial text-based message received from text-entry sender device 110. In some embodiments, a home automation device itself may convert text to synthesized speech for output. In other embodiments, home automation host server system 130 may produce an audio file based on the text-based message which may be transmitted to the home automation device and output. Each of these embodiments may be used together depending on the types of home automation devices through which the text-based message is to be output. For instance, only some home automation devices may be capable of transforming text to synthesized speech but additional home automation devices may be able to output audio files in particular formats.

Home automation devices 140 may be able to transmit information back to the home automation host server system 130 via network 120-2 or some other network that is indicative of whether the output speech was likely heard by the recipient and/or some other person. Home automation devices 140 may be configured to receive input from the recipient indicating that the message has been heard or home automation devices 140 may be able to detect the presence of the recipient or, more generally, the presence of a person which the sender can interpret as being the recipient if the sender is confident that only the recipient would be in the vicinity of home automation devices 140. As an example, home automation device 140-1 may be able to determine that a person is moving in its vicinity but cannot determine who the person is. However, the sender may know that only his wife would be near home automation device 140-1 when the message was output.

It should be understood that in some embodiments, smart devices other than home automation devices may be used. For example, an in vehicle voice interaction system may serve as a device which can output such synthesized speech. As another example, a user's smart phone or mobile device may be used to output synthesized speech similarly as detailed in relation to home automation devices 140. While system 100 illustrates three home automation devices 140, this is merely exemplary, fewer or greater numbers of home automation devices 140 may be present as part of system 100. It should further be understood that home automation devices 140 may be scattered at a particular location (e.g., within a home) or more distributed (e.g., within multiple homes or vehicles).

Home automation push service host server system 150 may be a service that is operated by a manufacturer or provider of particular home automation devices. Home automation push service host server system 150 may allow for various forms of push notifications to be pushed to various home automation devices. In some embodiments, in order to cause a home automation device to output vocalized text, the home automation device must be triggered to retrieve related information from home automation host server system 130. To do this, a message may be transmitted to home automation push service host server system 150 by text-entry sender device 110 or home automation host server system 130 which triggers a push notification to be transmitted to the associated home automation device. This push notification may cause the home automation device to contact home automation host server system 130 and retrieve information related to the message to be output as vocalized text.

Figure 2:
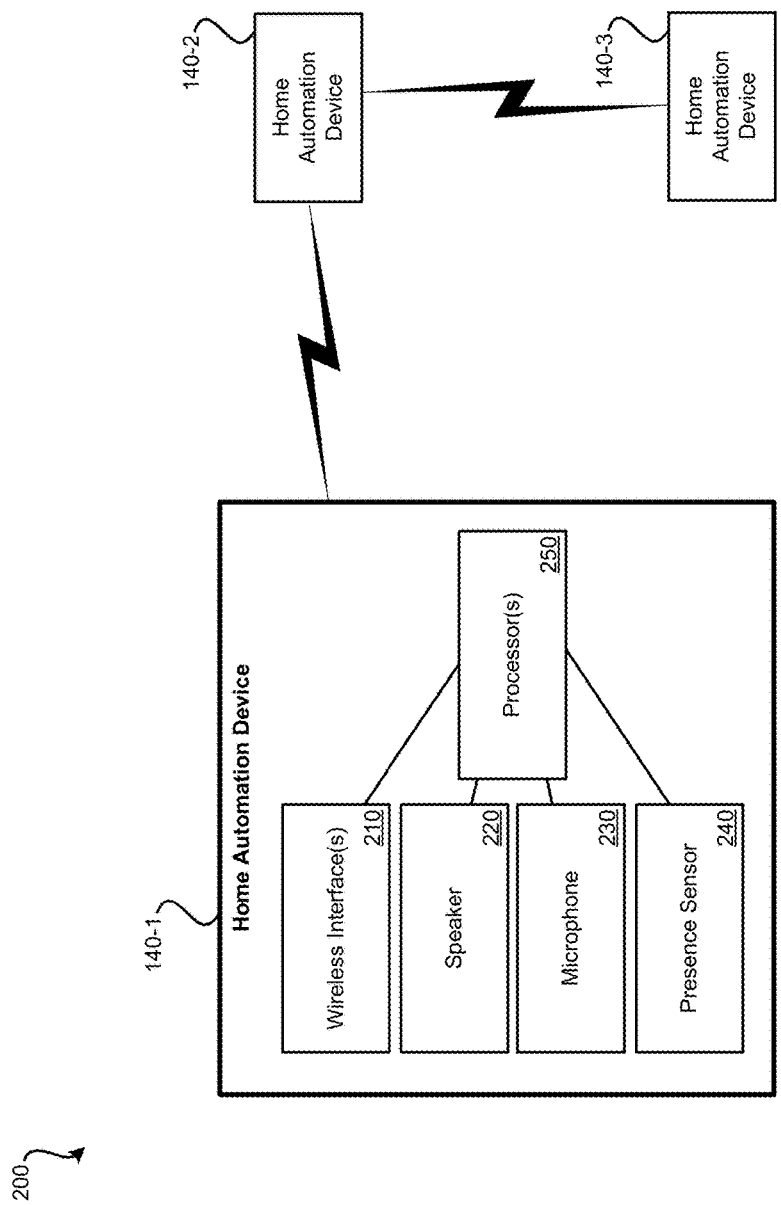
FIG. 2 illustrates an embodiment of a system of multiple home automation devices for delivering text-based messages by outputting synthesized speech.
Figure 8:
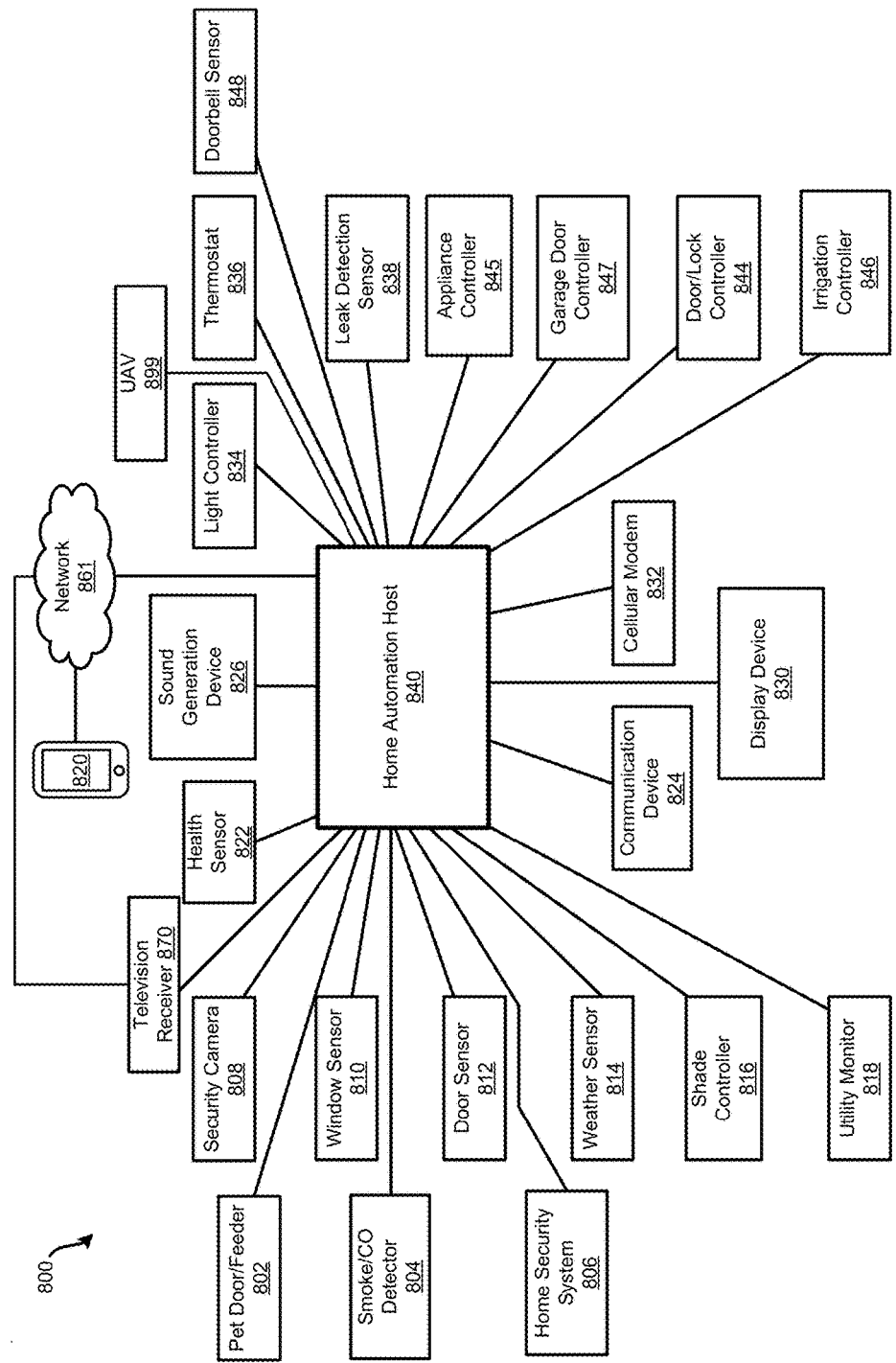
FIG. 8 illustrates an embodiment of a home automation system that includes multiple home automation devices which can output synthesized speech.

FIG. 2 illustrates an embodiment of a system 200 of multiple home automation devices 140 for delivering text-based messages by outputting synthesized speech. System 200 can represent a subsystem of system 100. Home automation device 140-1 is illustrated in greater detail as compared to the other illustrated home automation devices. Home automation device 140-1 may include: one or more wireless interfaces 210, speaker 220, microphone 230, presence sensor 240, and one or more processors 250. It should be understood that home automation device 140-1 may serve a primary purpose other than outputting synthesized speech of a text-based message. For example, FIG. 8 illustrates various home automation devices which may have at least some components in common in relation to home automation device 140-1. Therefore, it should be understood that the functionality detailed in relation to home automation devices 140 can serve as an additional or secondary function to a primary purpose of the home automation device.

Wireless interfaces 210 may allow home automation device 140-1 to communicate with a local wireless router via a wireless local area network. Through such a connection, home automation device 140-1 may be able to send and/or receive data from the Internet or some other form of network, such as the television service provider network of FIG. 7. The same or different wireless interface of wireless interfaces 210 may allow home automation device 140-1 to communicate with one or more other home automation devices, such as home automation device 140-2 and home automation device 140-3. Such communication may be via a mesh network that operates on a different frequency and using different protocol than a local wireless area network (e.g., WiFi network). In some embodiments, the home automation device may only communicate with a home automation hub device, which is configured to communicate with a wireless local area network. Another form of wireless interface which may be present may be to detect the presence of a mobile device associated with a particular user, who could be the intended recipient of a text-based message. For example, a Bluetooth® wireless interface may be included in one or more wireless interfaces 210 to detect an address associated with the recipient's mobile device. If the recipient's mobile device is determined to be present and, possibly, presence sensor 240 detects the presence of a person, a determination may be made that the recipient is in the vicinity of home automation device 140-1.

Speaker 220 may be configured to output audio at a sufficient volume to be heard at least in the general vicinity of home automation device 140-1. Microphone 230 may allow the user to speak at a reasonable volume to interact with home automation device 140-1. Presence sensor 240, which may include a movement sensor or passive infrared (PIR) sensor that may be used to detect the presence of a person in a general vicinity of home automation device 140-1. One or more processors 250 may be in communication with such components of home automation device 140-1. Processors 250 may be capable of converting text to synthesized speech for output by speaker 220. In some embodiments, one or more processors 250 may only be capable of processing and outputting a preformatted audio file via speaker 220. In such a case a separate system, such as home automation host server system 130, may synthesize the speech from the text and create an audio file for transmission to and playback by home automation device 140-1. Home automation devices 140-2 and 140-3 may have at least some similar components to home automation device 140-1. As such, while each of home automation devices 140 may have differing primary functions and/or differing makes and models, home automation devices 140 may have in common that synthesized speech can be output via speaker and a user can provide some form of input in response. In some embodiments, rather than a home automation device having a microphone, a button or some other form of user input device may be present in order for a user to provide input or feedback.

Figure 3A:
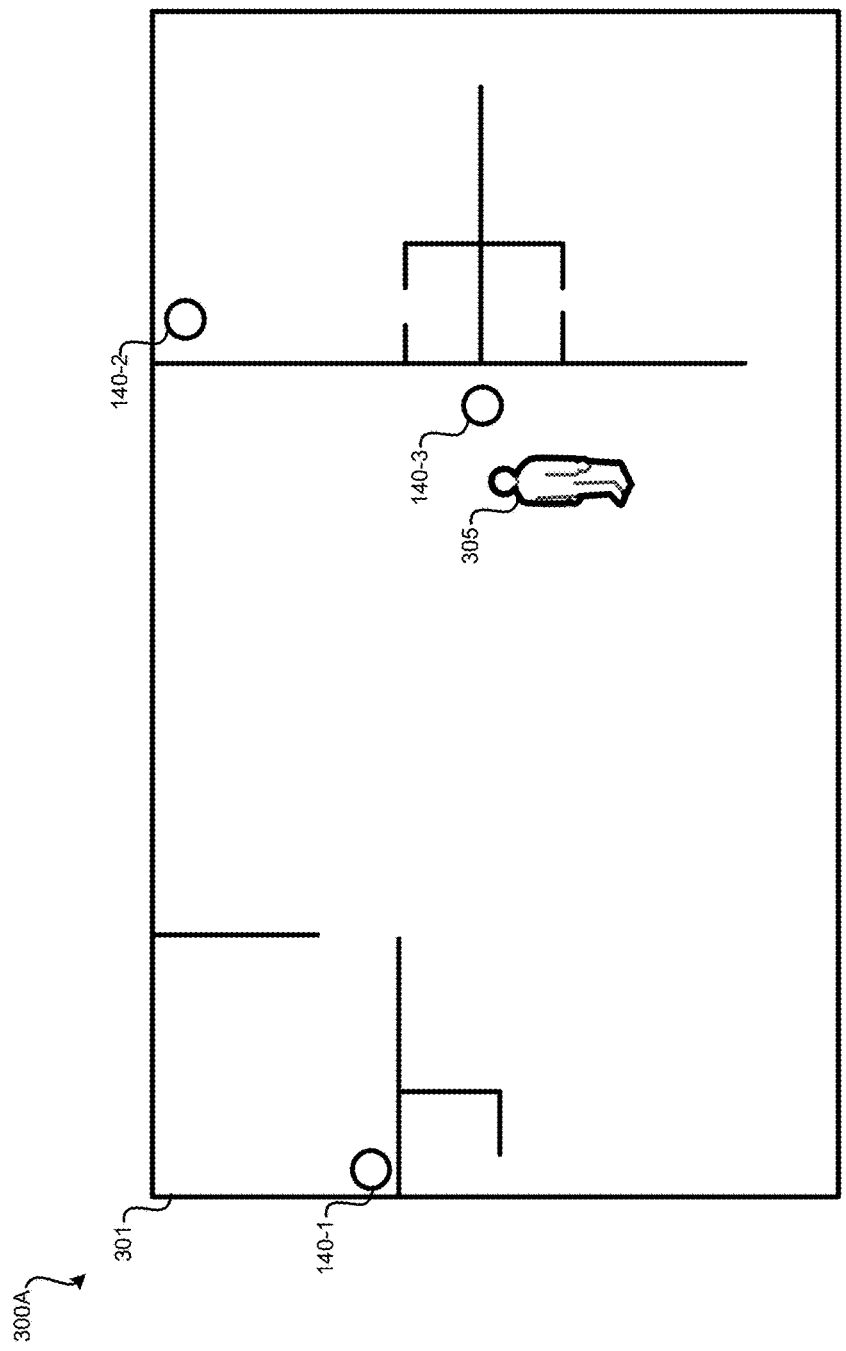
FIG. 3A illustrates an embodiment of a recipient being present in a home environment having multiple home automation devices.

FIG. 3A illustrates an embodiment 300A of a home 301 in which a recipient 305 is present. In home 301, home automation devices 140 are present in various rooms. Recipient 305 may be in the general vicinity of home automation device 140-3. A text-based message to be output as synthesized speech may be transmitted to some or all of home automation devices 140. In some embodiments, all home automation devices in a home that are associated with a particular designated vocalization destination or address may receive and output a message. With all of the home automation devices 140 present in home 301 outputting the message as speech the same time, the likelihood of recipient 305 hearing the message may be increased. In other embodiments, home automation devices 140 may output the message in a particular pattern, such as first by home automation device 140-1, second by home automation device 140-2, and finally by home automation device 140-3. This pattern may be interrupted if recipient 305 acknowledges hearing the message. In still other embodiments, the message may only be output as synthesized speech if movement or a presence of the user (who may be the intended recipient) is detected in the vicinity of the home automation device. For example, a presence sensor of home automation device 140-3 may detect the presence of recipient 305 and thus trigger home automation device 140-3 to output the synthesized speech.

It should be understood that recipient 305 may not need to provide any input to any of home automation devices 140 in order for the message to be output as speech. That is, output of the speech is not dependent on any local input. However, in other embodiments, the output of the message may be contingent on recipient 305 stating or otherwise providing input that he desires the message to be output. For instance, home automation device 140-3 may blink indicating that a text-based message received from a sender is ready to be output as synthesized speech. In other embodiments, recipient 305 may speak a command that causes the message to be output as synthesized speech.

Figure 3B:
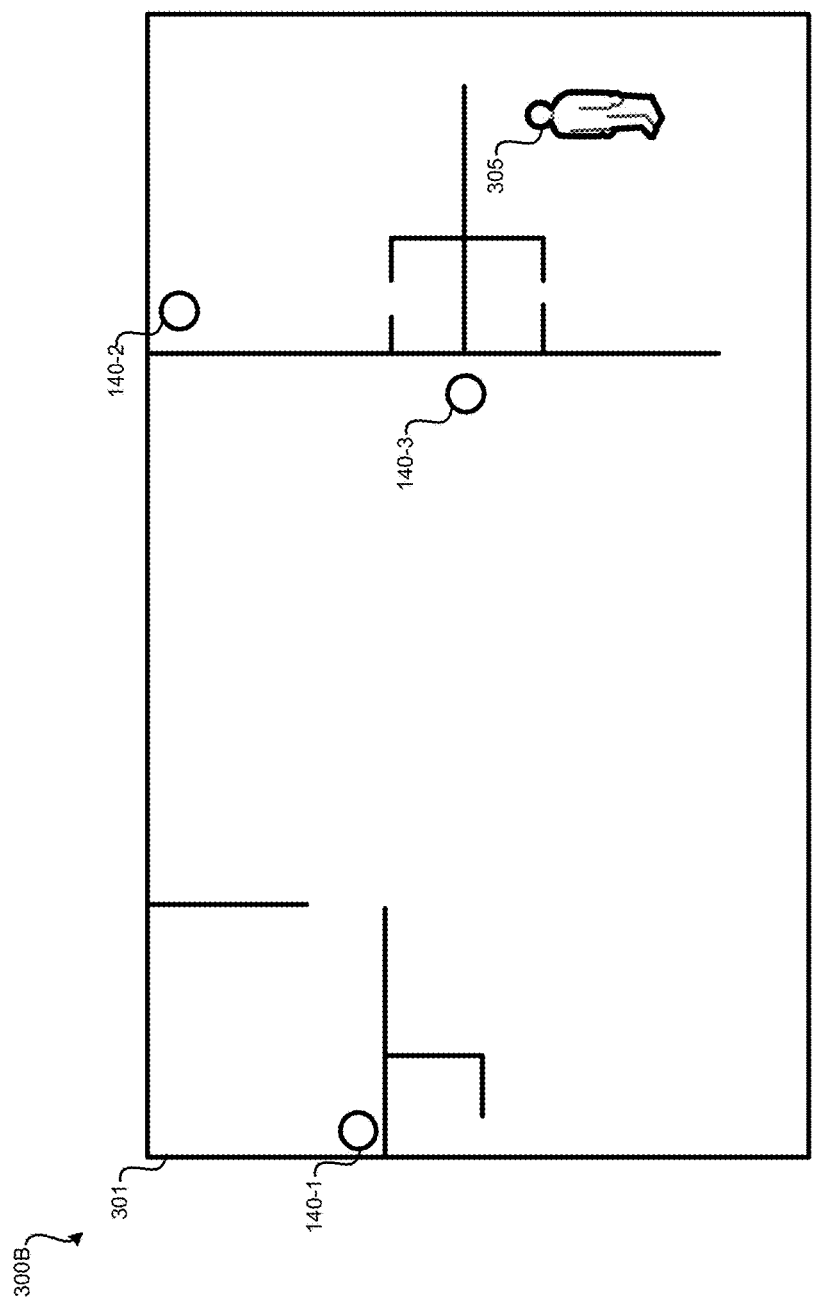
FIG. 3B illustrates another embodiment of the recipient being present in the home environment having multiple home automation devices.

FIG. 3B illustrates an embodiment 300B of home 301 in which recipient 305 is present. In embodiment 300B, recipient 305 is located in a room in which no home automation device 140 is present. How home automation devices 140 output the synthesized speech may vary since no home automation device may be detecting the presence of recipient 305. In some embodiments, this may involve one or more of home automation devices 140 outputting the synthesized speech at a higher volume. In other embodiments, if recipient 305 had previously been detected near one of home automation devices 140 within a time period, the message may be stored until recipient 305 reenters the vicinity of one of home automation devices 140. In still other embodiments, home automation devices 140 may respond to the home automation host server system indicating that recipient 305 is not nearby and the message has not been output as synthesized speech. Alternatively, home automation devices 140 may output the synthesized speech but may respond to the home automation host server system indicating it is unknown if recipient 305 heard the message.

Figure 4:
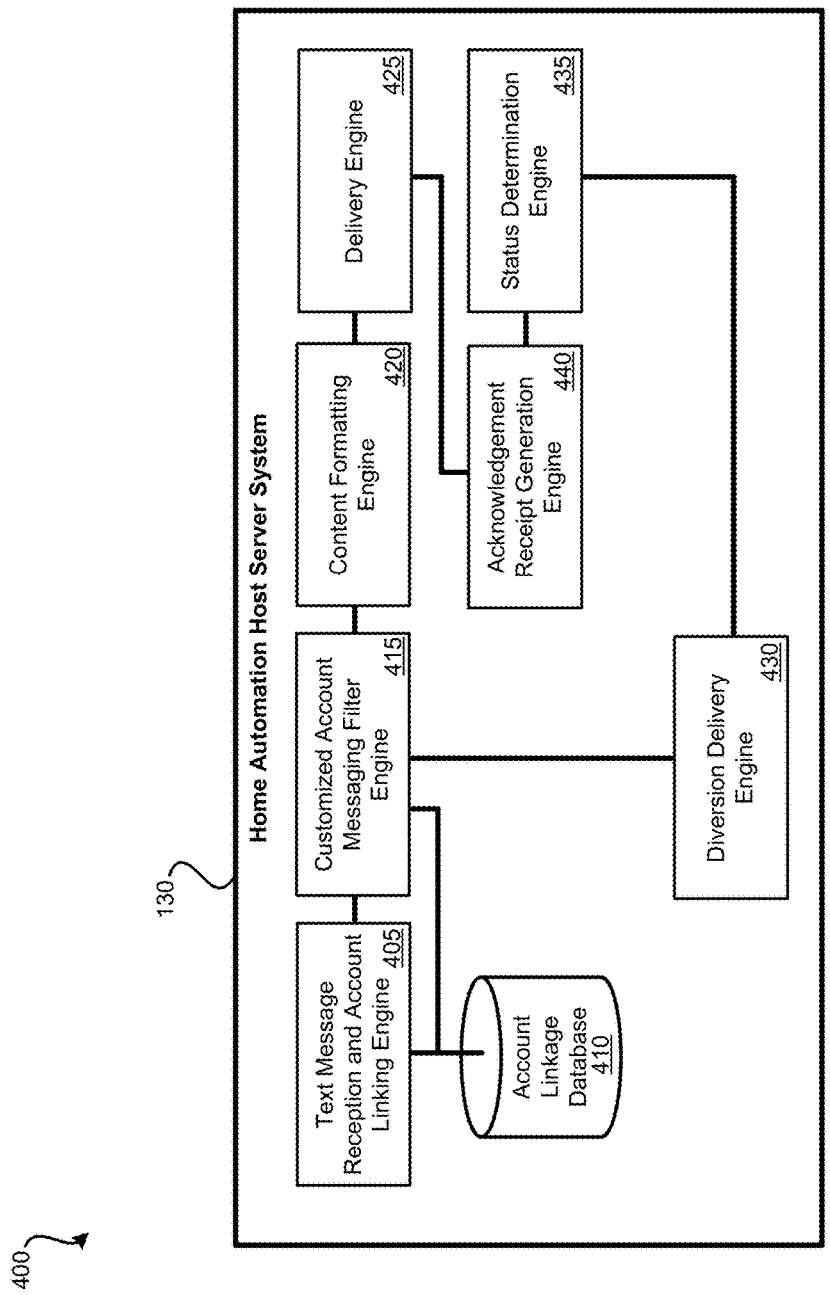
FIG. 4 illustrates an embodiment of a home automation host server system for delivering text-based messages by outputting synthesized speech via a home automation device.

FIG. 4 illustrates an embodiment of a home automation host server system 400 for delivering text-based messages by outputting synthesized speech via a home automation device. Home automation host server system 400 may represent a more detailed embodiment of home automation host server system 130 of FIG. 1. Home automation host server system 130 may include: text message reception and account linking engine 405, account linkage database 410, customized account messaging filter engine 415, content formatting engine 420, delivery engine 425, diversion delivery engine 430, status determination engine 435, and acknowledgment receipt generation engine 440. Home automation host server system 400 may be implemented using one or more server systems that implement the various components detailed herein as software code.

Text message reception and account linking engine 405 may receive the text-based message sent by a sender from text-entry sender device 110. The text-based message may include a sender's address or identifier as designated vocalization destination or electronic address (which could be the recipient's electronic address), and a text-based message to be delivered. Based on the designated vocalization destination address, an account may be identified. This account may be identified by accessing account linkage database 410 based on the designated vocalization destination or electronic address or the recipient's electronic address. If a record is present, the record may indicate various filtering parameters and one or more home automation devices through which the text-based message is requested to be output.

Customized account messaging filter engine 415 may serve to filter unwanted text-based messages from being output as synthesized speech by home automation devices. Customized account messaging filter engine 415 may implement various standard filters, such as spam filters and maximum message length filters, for all accounts. Other filters may be customized and set by the recipient or an administrator of the designated vocalization destination. Such filters can include:

1. A listing of authorized senders. The listing of authorized senders may be based on various addresses, phone numbers, and/or social media accounts which are permitted to send text-based messages to be output as synthesized speech via one or more home automation devices.
2. Password or passphrase regulated. The inclusion of a particular password or passphrase within the subject or body of the text-based message may serve as an authentication that the text-based message is being sent by an authorized party. For instance, a short string of passkey words may be used as the subject. This string of words may authorize the message for output and may not be output as synthesized speech as part of the message. In other embodiments, all messages received at a particular destination address may be considered authorized by virtue of the user knowing the particular destination address.
3. Keyword filtering. If a message contains certain words or phrases that are typically associated with advertisements or spam, the message may be blocked from being output via the one or more home automation devices as synthesized speech.
4. Recipient name. If a recipient's name matches a list of stored authorized recipients in the record retrieved from account linkage database 410, this may be evidence that the messages are authorized and would likely be desired by the recipient. As such, inclusion of the recipient named may serve to satisfy customized account messaging filter engine 415.

It should be understood that other forms of filtering are possible. Since the text-based message is to be output as synthesized speech, having accurate filtering is useful to prevent messages from being output is speech that recipients would find annoying, offensive, or inappropriate.

If the text-based message qualifies for output as determined by customized account messaging filter engine 415, content formatting engine 420 may serve to format the text-based message into inappropriate form to be output by the particular one or more home automation devices that are to output the synthesized speech. Content formatting engine 420 may retrieve from the record of account linkage database 410 indications of the types of home automation devices through which the synthesized speech is to be output. If a home automation device is capable of synthesizing speech, content formatting engine 420 may provide formatted text to the home automation device via delivery engine 425. If the home automation device is not capable of synthesizing speech, content formatting engine 420 may synthesize the speech and provide an audio file via delivery engine 425 to the home automation device.

Delivery engine 425 may serve to transmit the information (which could include formatted text and/or a synthesized speech audio file) to the appropriate home automation devices as indicated in account linkage database 410.

Status determination engine 435 may receive a response from one or more of the home automation devices that indicates whether or not the synthesized speech was heard by user or, more specifically, the recipient. Based upon any response received by status determination engine 435, acknowledgment receipt generation engine 440 may generate text-based message for transmission by delivery engine 425 to an address associated with the sender, which would likely be the address from which the initial text-based message originated. This acknowledgment receipt may indicate whether or not the synthesized speech was heard, whether the message was likely heard by the recipient, when it was heard, by whom it was heard, and/or at what home automation device the message was heard.

If a text-based message provided by the sender fails to satisfy the conditions enforced by customized account messaging filter engine 415, the message may be passed to diversion delivery engine 430. Diversion delivery engine 430 may transmit the text-based message (in text form) to another destination which will not result in one or more home automation devices outputting synthesize speech based on the text-based message. For example, diversion delivery engine 430 may forward the message to an email address of the recipient or an administrator of the designated vocalization destination. If this occurs, diversion delivery engine 430 may trigger status determination engine 435 to create and transmit an acknowledgment to the sender indicating that the message was not output as synthesized speech. This acknowledgment may or may not indicate the reason that the initial text-based message was not delivered and output.

Figure 5:
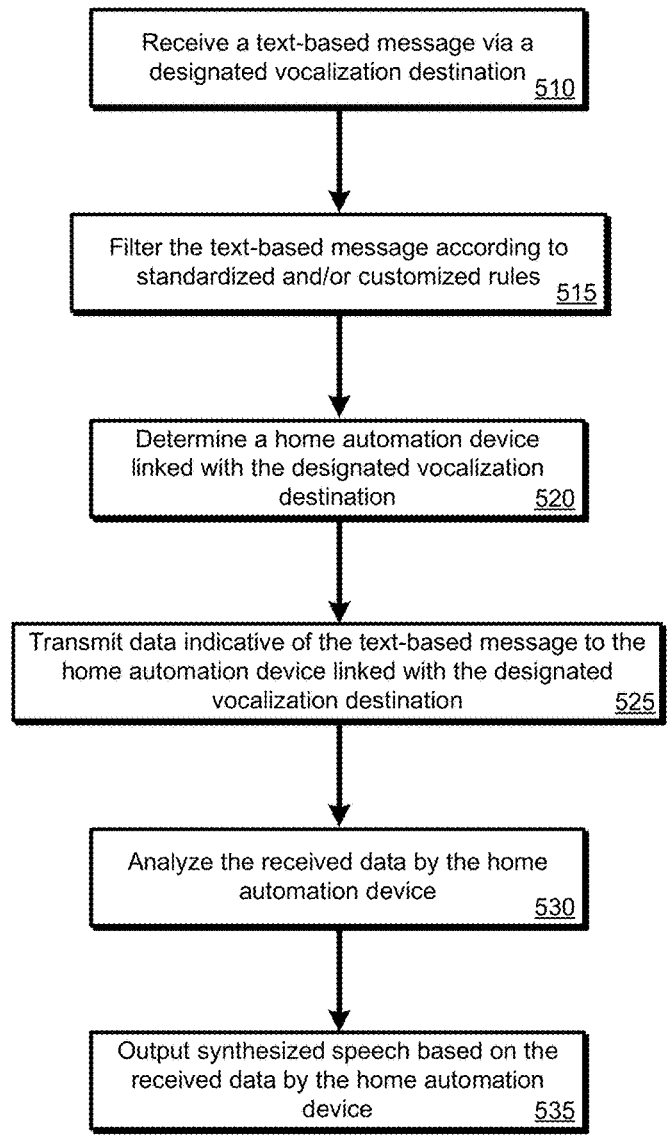
FIG. 5 illustrates an embodiment of a method for delivering a text-based message by outputting synthesized speech via a home automation device.

Various methods may be performed using the systems and devices detailed in relation to FIGS. 1-4. FIG. 5 illustrates an embodiment of a method 500 for delivering a text-based message by outputting synthesized speech via a home automation device. At block 510, a text-based message may be received by home automation host server system via a designated vocalization destination address. This home automation host server system may be arranged as detailed in relation to home automation host server system 400 of FIG. 4. The text-based message may be received from a sender's address (e.g., phone number, email address, social media account) and may be addressed to the designated vocalization destination. The designated vocalization destination address may be a phone number, email address, social media account, or other form of electronic address that is linked with a group of one or more home automation devices. In other embodiments, the designated vocalization destination address may be the recipient's phone number, email address, social media account or other form of electronic address. The text-based message may include text the sender desires to be output as speech by the one or more home automation devices. The home automation host system may use the designated vocalization destination to determine a particular account in the home automation devices associated with the particular account.

At block 515, the text-based message may be filtered according to standardized and/or customized rules. Standardized rules may be enforced by the home automation host server system for all text-based messages addressed to various designated vocalization destinations. Such standardized filters may be used to filter out spam. Customized rules may be set by the administrator of the designated vocalization destination or the recipient. For example, customized rules may be those as detailed in relation to customized account messaging filter engine 415 of FIG. 4.

At block 520, based upon the designated vocalization destination, one or more home automation devices may be determined by the home automation host server system. These are the home automation devices through which the text-based message is to be output as synthesized speech or are at least eligible for the text-based message to be output as synthesized speech. (For example, if a prioritized list of home automation devices is stored by the home automation host system in association with the account, a later home automation device on the list may not output the synthesized speech if the speech is first output through another home automation device and the recipient acknowledges hearing the message.)

At block 525, data indicative of the text-based message may be transmitted to the one or more home automation devices (such as any of home automation devices 140) linked with the designated vocalization destination by the home automation host server system. This data may include the message in text form if the home automation device is capable of synthesizing speech. This data may include an audio file that includes synthesized speech if the home automation device is not capable of synthesizing speech. In some embodiments, even if the home automation device is capable of synthesizing speech, the home automation host system may send an audio file that includes synthesized speech such that the speech sounds similar regardless of the make/model of the home automation device outputting the speech.

At block 530, the data may be received and analyzed by one or more home automation devices. The received data may be analyzed to determine any additional information or adjustments to be made, such as a volume setting of the home automation device or a pre-message or post-message addendum, such as: "Message from sender" or "Do you want to send an acknowledgment or reply?" By virtue of a home automation device receiving the data, this may indicate that the message is to be output by the home automation device as soon as possible. That is, the home automation device may not wait for any input from a nearby user before outputting the synthesized speech at block 535. In other embodiments, the home automation device may wait until movement is detected in the vicinity of the home automation device before outputting the speech. In other embodiments the home automation device may monitor for movement or presence of the user within a defined time period. For instance, if movement has been detected within the last five minutes, the speech may be output.

Figure 6:
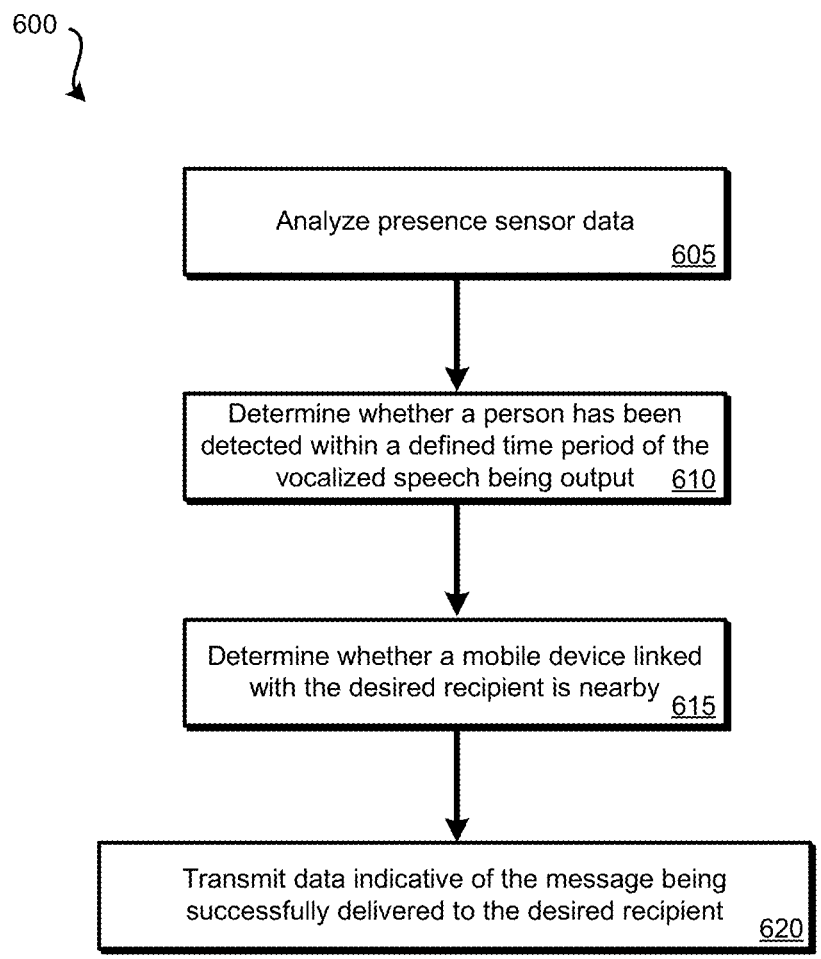
FIG. 6 illustrates an embodiment of a method for determining whether a delivered message was likely heard by a recipient.

FIG. 6 illustrates an embodiment of a method 600 for determining whether a delivered message was likely heard by a recipient. Method 600 may be performed by a home automation device, such as home automation device 140-1 of FIG. 1. At block 605, presence sensor data collected by the home automation device may be analyzed. This presence sensor data may be for a defined time period including time prior to a synthesized speech message being output and/or for time after the synthesized speech message being output.

At block 610, based upon the analyzed presence sensor data of block 605, a determination may be made whether a person has been detected in a vicinity of the home automation device within the defined time period. This determination may be made by the home automation device or by the home automation host based on sensor data received from the home automation device. At block 615, it may be determined whether a mobile device that is linked with the desired recipient is nearby. In such embodiments, the data received by the home automation device that is used to output the synthesized speech may include other data, including an identifier of the recipient, such as a Bluetooth identifier of the recipient's mobile device or some other identifier that identifies the recipient's mobile device. If such an identifier is detected within range, the home automation device or host system may determine that the recipient heard the message because a person is nearby and a mobile device of the intended recipient is nearby. At block 620, if the determination is made by the home automation device, data indicative of the message having been successfully delivered to the desired recipient may be transmitted to the home automation host server system based on the determination of block 615. This data may be used by the home automation host system to generate an acknowledgment receipt that is transmitted back to the sender indicating successful delivery of the message in the form of synthesized speech. If a person is detected in the vicinity of the home automation device within the defined time period at block 610 but the mobile device of the desired recipient is not determined to be nearby at block 615, the data transmitted at block 620 may indicate that the message was likely heard but it is unclear whether the desired recipient was the person who heard the message. An acknowledgment of such may be sent by the home automation host server system to the sender's device. If the determination of block 610 indicates that a person is not nearby, the data transmitted at block 620 may indicate that no user appeared to be in the vicinity when the synthesized speech was output. Acknowledgment of such may be sent by the home automation host server system to the sender's device. In such a scenario, in some embodiments, if the mobile device of the desired recipient is nearby, the acknowledgment may include an indication that there is evidence that the desired recipient is in the area even though movement or a presence was not detected.

In other embodiments, additional or alternate ways of determining that the recipient or at least another person has heard the synthesized speech may be used. For instance, after outputting synthesized speech, the home automation device may ask, via synthesized speech, whether the message was heard, who the message was heard by, and/or whether to send it an acknowledgment indicating as such. As an example, the home automation device may output: "Did you hear that?" If a person responds in the affirmative, the home automation device may ask, "Is that you, [recipient]?" with recipient referring to the intended recipient. If again an affirmative response is received, the home automation device may provide a response to the home automation host system indicating that the desired recipient has heard the message. If a negative response was received or no response was received, the home automation host system may receive data indicating that it is unlikely that the intended recipient heard the message. In some embodiments, rather than speaking a response, the recipient may push a button or otherwise provide input to the home automation device that acknowledges receipt of the message. In some embodiments, such queries are posed if the home automation device does not detect the presence of the recipient's mobile device.

Figure 7:
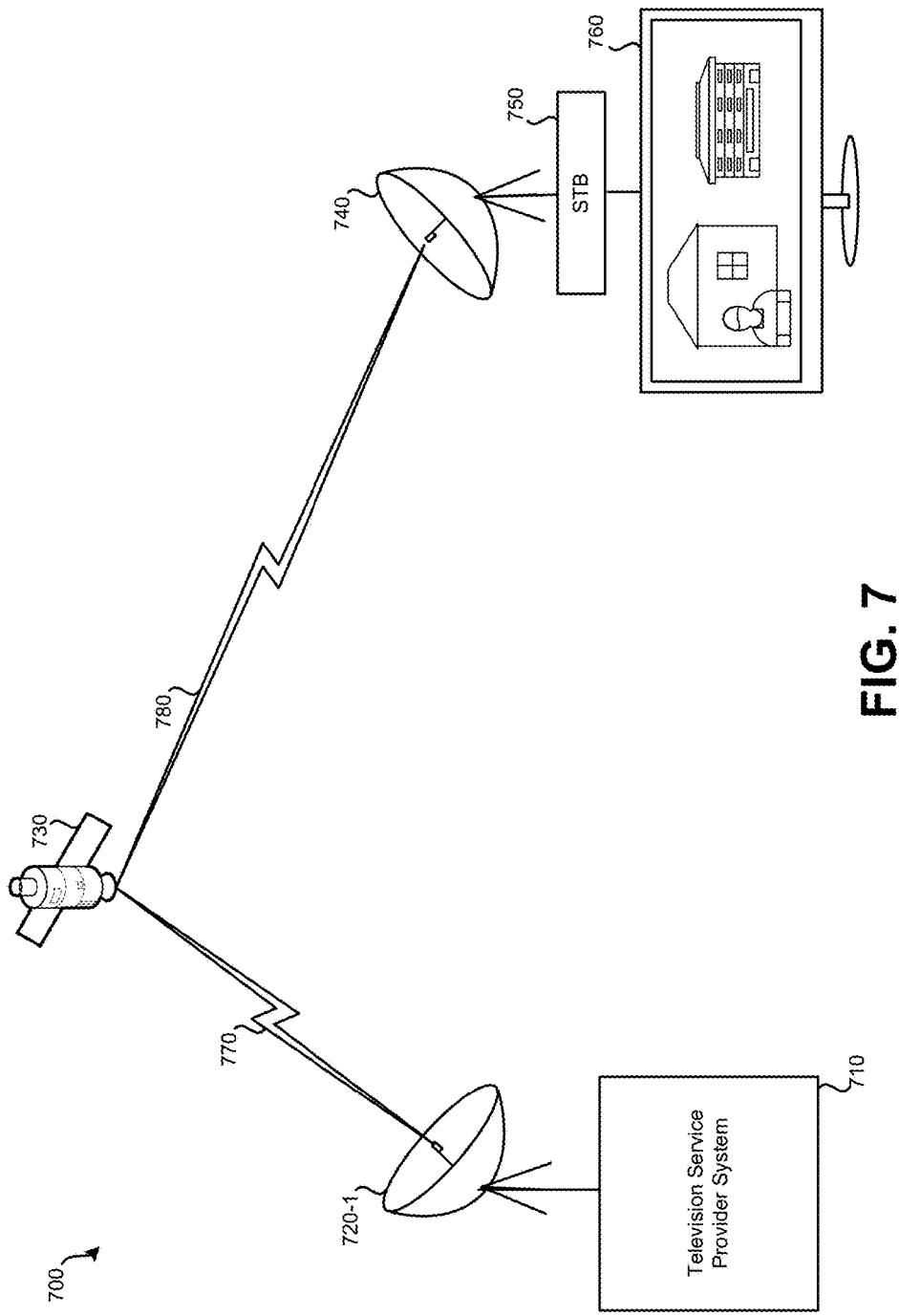
FIG. 7 illustrates an embodiment of a television programming distribution system that can be used to facilitate the delivery of text-based messages that are to be output by a home automation device.

FIG. 7 illustrates an embodiment of a television programming distribution system that can be used to facilitate the delivery of text-based messages that are to be output by a home automation device. Some homes or other locations may not have an Internet connection. Rather than the Internet functioning as network 120-2 of FIG. 1, a television distribution system can allow for data to be transmitted by a home automation host server system 130 (which can function as part of a television service provider system) to one or more home automation devices located within a home. FIG. 7 illustrates an embodiment of a satellite television distribution system 700. Satellite television distribution system 700 may include: television service provider system 710, satellite transmitter equipment 720, satellites 730, satellite dish 740, set top box 750, and television 760. Alternate embodiments of satellite television distribution system 700 may include fewer or greater numbers of components. While only one satellite dish 740, set top box 750, and television 760 (collectively referred to as "user equipment") are illustrated, it should be understood that multiple (e.g., tens, thousands, millions) instances of user equipment may receive television signals from satellites 730. For example, a particular person may have user equipment at multiple homes or other locations.

Television service provider system 710 and satellite transmitter equipment 720 may be operated by a television service provider. A television service provider may distribute television channels, on-demand programming, programming information, and/or other data to users, such as data that can be used by home automation devices to output synthesized speech messages. Television service provider system 710 may include home automation host server system 130 and may serve to distribute information to cause synthesized speech to be output by home automation devices in various homes by addressing such data to a specific television receiver associated with the home automation device that is to output the synthesized speech (in some embodiments, the television receiver itself can output the synthesized speech, possibly via a television).

Television service provider system 710 may receive feeds of one or more television channels from various sources. Such television channels may include multiple television channels that contain the same content (but may be in different formats, such as high-definition and standard-definition). To distribute such television channels, feeds of the television channels may be relayed to user equipment via one or more satellites via transponder streams. Satellite transmitter equipment 720 may be used to transmit a feed of one or more television channels from television service provider system 710 to one or more satellites 730. While a single television service provider system 710 and satellite transmitter equipment 720 are illustrated as part of satellite television distribution system 700, it should be understood that multiple instances of transmitter equipment may be used, possibly scattered geographically to communicate with satellite 730. Such multiple instances of satellite transmitting equipment may communicate with the same or with different satellites. Different television channels may be transmitted to satellite 730 from different instances of transmitting equipment. For instance, a different satellite dish of transmitting equipment 720 may be used for communication with satellites in different orbital slots.

Satellite 730 may be configured to receive signals, such as streams of television channels, from one or more satellite uplinks such as satellite transmitter equipment 720. Satellite 730 may relay received signals from satellite transmitter equipment 720 (and/or other satellite transmitter equipment) to multiple instances of user equipment via transponder streams. Different frequencies may be used for uplink signal 770 from downlink signal 780. Multiple satellites, including satellite 730, may be used to relay television channels from television service provider system 710 to satellite dish 740. Different television channels may be carried using different satellites. Different television channels may also be carried using different transponders of the same satellite; thus, such television channels may be transmitted at different frequencies and/or different frequency ranges.

Satellite dish 740 is an antenna that is used to receive transponder streams from one or more satellites, such as satellite 730. Satellite dish 740 may be provided to a user for use on a subscription basis to receive television channels provided by the television service provider system 710, satellite uplink 720, and/or satellite 730. Satellite dish 740 may be configured to receive transponder streams from multiple satellites and/or multiple transponders of the same satellite. Satellite dish 740 may be configured to receive television channels and other data via transponder streams on multiple frequencies.

In communication with satellite dish 740, may be one or more sets of television receivers. A television receiver may be configured to decode signals received from satellites 730 via satellite dish 740 for display on a display device, such as television 760. A television receiver may be incorporated as part of a television or may be part of a separate device, commonly referred to as a set-top box (STB). A television receiver may include a satellite tuner configured to receive television channels via a satellite. In FIG. 7, a television receiver is present in the form of set top box 750. As such, set top box 750 may decode signals received via satellite dish 740 and provide an output to television 760.

STB 750 may serve as an in-home host system for multiple home automation devices or may at least communicate with various home automation devices, such as by using a wireless communication protocol. Therefore, information received by STB 750 may be routed to one or more home automation devices present within the home via a local wireless communication protocol. If communication with satellite 730 is unidirectional, it may not be possible for a home automation device to send an acknowledgment indicating whether the synthesized speech has been heard by a user when an alternate network connection is available.

Television 760 may be used to present video and/or audio decoded by set top box 750. Set top box 750 may also output a display of one or more interfaces to television 760, such as an electronic programming guide (EPG). In some embodiments, a display device other than a television may be used. While a home automation device may output synthesized speech based on a text-based message, the television, based on data output by STB 750, may be used to output the message in text form, which may be less intrusive if the recipient or a user is watching television.

Uplink signal 770 represents a signal between satellite uplink 720 and satellite 730. Uplink signal 770 represents a signal between satellite uplink 720 and satellite 730. Uplink signal 770 may contain streams of one or more different television channels. For example, uplink signal 770 may contain a certain group of television channels. Each of these television channels may be scrambled such that unauthorized persons are prevented from accessing the television channels.

FIG. 7 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 8 illustrates an embodiment of a home automation system that can use various home automation devices to output synthesized speech. FIG. 8 illustrates an embodiment of a home automation system 800 hosted by home automation host 840. In home automation system 800, home automation host 840 functions as a hub to communicate with home automation devices; it should be understood that in other embodiments, a hub device may not be necessary (e.g., a home automation device may communicate directly with an internet service provider via a network connection). Home automation host 840 may function as an overlay device that can overlay visual data onto a video signal presented on a display device. Home automation host 840 refers to a device that can be connected with a separate display device 830, such that information regarding the home automation system is presented by display device 830. In some embodiments, home automation host 840 receives data from a separate device, such as television receiver 870, and overlays home automation data and user interfaces over television signals (e.g., television programming) output by television receiver 870. Television receiver 870 may be configured to receive television programming from a satellite-based television service provider; in other embodiments, other forms of television service provider networks may be used, such as an IP-based network (e.g., fiber network), a cable based network, a wireless broadcast-based network, etc.

In some embodiments, home automation host 840 may be coupled between television receiver 870, which may be in the form of a set top box (STB), and display device 830, which may be a television. In such embodiments, television receiver 870 may receive, decode, descramble, decrypt, store, and/or output television programming. Television receiver 870 may output a signal, such as in the form of an HDMI signal. Rather than be directly input to display device 830, the output of television receiver 870 may be input to home automation host 840. Home automation host 840 may receive the video and/or audio output from television receiver 870. Home automation host 840 may reformat and/or add additional information to the video and/or audio signal received from television receiver 870. The modified video and/or audio signal may be output to display device 830 for presentation. In some embodiments, home automation host 840 has an HDMI input and an HDMI output, with the HDMI output being connected to display device 830.

In the illustrated embodiment of FIG. 8, home automation host 840 serves as a home automation host system. In other embodiments, it should be understood that television receiver 870 may serve as the home automation host system. Therefore, in other embodiments, functionality attributed to home automation host 840 may instead be fully or partially implemented by television receiver 870. In still other embodiments, a different device, such as a dedicated computerized device, or another device illustrated as part of home automation system 800, can serve as the home automation host system.

Home automation host 840 may be configured to communicate with multiple home automation devices. The devices with which home automation host 840 communicates may use different communication standards, including both wireless and wired communication standards. For instance, one or more devices may use a low-power wireless network communication protocol, such as ZigBee® while one or more other devices communicate using Z-Wave®. Other forms of local wireless communication may be used by devices and home automation host 840. For instance, home automation host 840 and one or more devices may be configured to communicate using a wireless local area network, which may use a communication protocol such as IEEE 802.11.

Using home automation host 840 to present automation information via display device 830 may have additional benefits. For instance, multiple devices may provide input video to home automation host 840. For instance, television receiver 870 may provide television programming to home automation host 840, a DVD/Blu-Ray® player may provide stored content to home automation host 840, and a separate internet-TV device may stream other programming to home automation host 840. Regardless of the source of the video/audio, home automation host 840 may output video and/or audio that has been modified to include home automation information and output to display device 830. As such, in such embodiments, regardless of the source of video/audio, home automation host 840 may modify the audio/video to include home automation information and, possibly, solicit for user input. For instance, in some embodiments, home automation host 840 may have four video inputs (e.g., four HDMI inputs) and a single video output (e.g., an HDMI output). In other embodiments, such overlay functionality may be part of television receiver 870. As such, a separate device, such as a Blu-ray® player, may be connected with a video input of television receiver 870, thus allowing television receiver 870 to overlay home automation information when content from the Blu-Ray® player is being output to display device 830.

Regardless of whether television receiver 870 is itself configured to provide home automation functionality and output home automation input for display via display device 830 or such home automation functionality is provided via home automation host 840, home automation information may be presented by display device 830 while television programming is also being presented by display device 830. For instance, home automation information may be overlaid or may replace a portion of television programming (e.g., broadcast content, stored content, on-demand content, etc.) presented via display device 830.

In some embodiments, a separate device may be connected with home automation host 840 to enable communication with home automation devices. For instance, communication device 824 may be in communication with home automation host 840. Communication device 824 may be in the form of a dongle. Communication device 824 may be configured to allow for Zigbee®, Z-Wave®, and/or other forms of (low-power) wireless or wired communication. The communication device may connect with home automation host 840 via a USB port or via some other type of (wired) communication port. Communication device 824 may be powered by the overlay device (or television receiver, if the television receiver is serving as the home automation host system) or may be separately coupled with a power source. In some embodiments, home automation host 840 may be enabled to communicate with a local wireless network and may use communication device 824 in order to communicate with devices that use a ZigBee® communication protocol, Z-Wave® communication protocol, and/or some other home wireless communication protocols.

Communication device 824 may also serve to allow additional components to be connected with home automation host 840 or television receiver 870. For instance, communication device 824 may include additional audio/video inputs (e.g., HDMI), a component, and/or a composite input to allow for additional devices (e.g., Blu-ray players) to be connected with television receiver 870 and/or home automation host 840. Such connection may allow video from such additional devices to be overlaid with home automation information. Whether home automation information is overlaid onto video may be triggered based on a user's press of a remote control button.

Regardless of whether home automation host 840 uses communication device 824 to communicate with home automation devices, home automation host 840 may be configured to output home automation information for presentation to a user via display device 830, which may be a television, monitor, or other form of device capable of presenting visual information. Such information may be presented simultaneously with television programming received by television receiver 870. Television receiver 870 may also, at a given time, output television programming that may be augmented or replaced by home automation information by home automation host 840. The user may be able to provide input to television receiver 870 and/or home automation host 840 to control the home automation system hosted by either television receiver 870 or by home automation host 840, as detailed below.

Television receiver 870 or home automation host 840 may be configured to communicate with one or more wireless devices, such as (wireless) mobile device 820. Mobile device 820 may represent a tablet computer, cellular phone (e.g., smartphone), laptop computer, remote computer, or some other device through which a user may desire to control home automation settings and view home automation information. Such a mobile device also need not be wireless, such as a desktop computer. Television receiver 870, communication device 824, or home automation host 840 may communicate directly with mobile device 820, or may use a local wireless network, such as network 861. Mobile device 820 may be remotely located and not connected with a same local wireless network. Via the Internet, television receiver 870 or home automation host 840 may be configured to transmit a notification and/or other information to mobile device 820 regarding home automation information. For instance, in some embodiments, a third-party notification server system, such as the notification server system operated by Apple®, may be used to send push notifications to mobile device 820.

In some embodiments, a location of mobile device 820 may be monitored. A user may be able to define which home automation functions are controlled based on a position of mobile device 820 or which home automation device is used to output synthesized speech from a text-based message. For example, as detailed within this document, whether a notification is sent may be dependent upon a location of a mobile device relative to a home automation sensor for which the notification is pertinent. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 870.

Mobile device 820 may serve as an input device for television receiver 870 and/or home automation host 840.

For instance, mobile device 820 may be a tablet computer that allows text to be typed by a user and provided to television receiver 870. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While mobile device 820 may be used as the input device for typing text, television receiver 870 may output for display text to display device 830. As another example, if a user needs to provide a location (such as Global Positioning System (GPS) coordinates) to a home automation system, mobile device 820 may be brought to the physical location associated with a waypoint to log the associated coordinates.

In some embodiments, a cellular modem 832 may be connected with either home automation host 840 or television receiver 870. Cellular modem 832 may be useful if a local wireless network is not available. For instance, cellular modem 832 may permit access to the Internet and/or communication with a television service provider. Communication with a television service provider may also occur via a local wireless or wired network connected with the Internet. In some embodiments, information for home automation purposes may be transmitted by a television service provider system to television receiver 870 or home automation host 840 via the television service provider's distribution network, which may include the use of satellites.

Various home automation (sensor) devices may be in communication with television receiver 870 or home automation host 840. Some or all of such home automation devices may be able to output synthesized speech such that a person nearby can receive a message as detailed in relation to FIGS. 1-7. Some or all of such home automation devices may function as part of a low-power wireless network mesh network to allow for communication between home automation host 840 and such devices. Such home automation devices may use disparate communication protocols. Such home automation devices may communicate with television receiver 870 directly or via communication device 824. Such home automation devices may be controlled by a user and/or have a status viewed by a user via display device 830 and/or mobile device 820. Home automation devices may include: smoke/carbon monoxide (CO) detector 804, home security system 806, pet door/feeder 802, security camera 808, window sensor 810, irrigation controller 846, weather sensor 814, shade controller 816, utility monitor 818, heath sensor 822, sound generation device 826 (which can refer to the sound generation devices of FIGS. 8-5), light controller 834, thermostat 836, leak detection sensor 838, home automation host 840, appliance controller 845, garage door controller 847, and doorbell sensor 848.

Leak detection sensor 838 may detect the presence of water or the flow of water through a pipe. The presence of water or the excessive flowing of water through the pipe may trigger a message to be transmitted to the home automation host system. Appliance controller 845 may be able to provide status messages about one or more appliances and/or control the functionality of one or more appliances. Garage door controller 847 may provide a status on the position of a garage door (open or closed) and/or may be able to control opening and closing of the garage door. Irrigation controller 846 may be able to provide a status of an irrigation system (on, off, current zone being watered) and may be able to control the irrigation system. Shade controller 816 may be able to provide a status as to the current position of a shade and may be able to control the position of the shade. Window sensor 810 may be able to provide a status as to the current position of a window (open or shut) and may be able to control the position of the window. Sound generation device 826 may refer to the sound generation devices detailed in relation to FIGS. 8-5 and can allow for sound to be output into the ambient environment of the sound generation device. Light controller 834 may be able to control whether a light is on or off and may be able to provide a status of the light. Pet door/feeder 802 may allow for home automation host 840 to control whether the pet door is locked or unlocked and dispense food. Smoke/CO detector 804 may be combined detector device or separate devices that can detect the presence of smoke and/or CO and provide such a status to home automation host 840. Home security system 806 may be enabled and disabled via home automation host 840 and may provide status information to home automation host 840 (e.g., movement detected, door ajar, glass break, etc.). Weather sensor 814 may provide weather data to home automation host 840. Utility monitor 818 may provide information on the use of utilities (e.g., power, gas, oil, water) to home automation host 840.

Door sensor 812 and lock controller 844 may be incorporated into a single device, such as a door lock and sensor unit, and may allow for a door's position (e.g., open or closed) to be determined and for a lock's state to be determined and changed. Door sensor 812 may transmit data to television receiver 870 or home automation host 840 that indicates the status of a door. Such status may indicate open or closed. When a status change occurs, the user may be notified as such via mobile device 820 or display device 830. Further, a user may be able to view a status screen to view the status of one or more door sensors throughout the location. Window sensor 810 and/or door sensor 812 may have integrated glass break sensors to determine if glass has been broken. Lock controller 844 may permit a door to be locked and unlocked and/or monitored by a user via television receiver 870 or home automation host 840. No mechanical or electrical component may need to be integrated separately into a door or door frame to provide such functionality. Such a single device may have a single power source that allows for sensing of the lock position, for sensing of the door position, and for engagement and disengagement of the lock.

UAV 899 can be capable of streaming video and/or audio gathered outside of a home to display device 830 via home automation host 840 (or television receiver 870) and/or streaming such video and/or audio to a remote server via network 861. Via a service provider's server system, the video and/or audio may be streamed to mobile device 820 or any other remote computerized device through which an authorized user is logged in. In some embodiments, video and/or audio from UAV 899 may be retrieved directly by mobile device 820 from home automation host 840.

Additional forms of sensors not illustrated in FIG. 8 may also be incorporated as part of a home automation system. For instance, a mailbox sensor may be attached to a mailbox to determine when mail is present and/or has been picked up. The ability to control one or more showers, baths, and/or faucets from television receiver 870 and/or mobile device 820 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 870 or home automation host 840 when within range. For instance, when a vehicle has been parked within range of a local wireless network with which the home automation host is connected, video and/or audio may be transmitted from the dashcam to the television receiver for storage and/or uploading to a remote server.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for providing a text-based message to a recipient as synthesized speech, the method comprising:
   receiving, by a home automation host server system, the text-based message addressed to a designated vocalization destination from an electronic address associated with a sender;
   filtering, by the home automation host server system, the text-based message to determine that the text-based message is eligible for output as synthesized speech;
   determining, by the home automation host server system, a home automation device linked with the designated vocalization destination;
   transmitting, by the home automation host server system, data corresponding to the text-based message addressed to the designated vocalization destination to the home automation device; and
   causing the home automation device to output, via a speaker of the home automation device, at least a portion of the text-based message as synthesized speech.

2. The method for providing the text-based message to the recipient as synthesized speech of claim 1, further comprising:
   determining, by the home automation host server system, that the synthesized speech of the text-based message was heard by the recipient; and
   in response to determining that the synthesized speech of the text-based message was heard by the recipient, transmitting to the electronic address linked with the sender an acknowledgment of the text-based message having been heard.

3. The method for providing the text-based message to the recipient as synthesized speech of claim 2, wherein determining that the synthesized speech of the text-based message was heard by the recipient is based on the recipient providing a vocalized acknowledgment of the text-based message having been heard to the home automation device.

4. The method for providing the text-based message to the recipient as synthesized speech of claim 2, wherein determining that the synthesized speech of the text-based message was heard by the recipient is based on motion having been detected by the home automation device within a time period of the text-based message having been output as the synthesized speech.

5. The method for providing the text-based message to the recipient as synthesized speech of claim 1, further comprising:
   determining, by the home automation host server system, that the synthesized speech of the text-based message was not heard; and
   in response to determining that the synthesized speech of the text-based message was not heard by the recipient, transmitting to the electronic address linked with the sender an acknowledgment of the text-based message not having been heard.

6. The method for providing the text-based message to the recipient as synthesized speech of claim 5, wherein determining that the synthesized speech of the text-based message was not heard is based on no vocalized acknowledgment of the text-based message having been heard being provided to the home automation device.

7. The method for providing the text-based message to the recipient as synthesized speech of claim 5, wherein determining that the synthesized speech of the text-based message was not heard is based on no motion having been detected by the home automation device within a time period of the text-based message having been output as the synthesized speech.

8. The method for providing the text-based message to the recipient as synthesized speech of claim 1, wherein determining the home automation device linked with the designated vocalization destination comprises:
   determining a plurality of home automation devices linked with the designated vocalization destination; and selecting the home automation device from the plurality of home automation devices based on motion being detected by the home automation device.

9. The method for providing the text-based message to the recipient as synthesized speech of claim 1, wherein:
determining the home automation device linked with the designated vocalization destination comprises determining a plurality of home automation devices linked with the designated vocalization destination, the plurality of home automation devices comprising the home automation device; and the method further comprising:
causing multiple home automation devices of the plurality of home automation devices to output at least the portion of the text-based message as synthesized speech.

10. A system for providing a text-based message to a recipient as synthesized speech, the system comprising:
a home automation server system comprising:
one or more processors; and
a memory communicatively coupled with and readable by the one or more processors and having stored therein processor-readable instructions which, when executed by the one or more processors, cause the one or more processors to:
receive the text-based message addressed to a designated vocalization destination from an electronic address associated with a sender;
filter the text-based message to determine that the text-based message is eligible for output as synthesized speech;
determine a home automation device linked with the designated vocalization destination; and
cause data corresponding to the text-based message addressed to the designated vocalization destination to be transmitted to the home automation device; and
the home automation device that outputs, via a speaker of the home automation device, at least a portion of the text-based message as synthesized speech.

11. The system for providing the text-based message to the recipient as synthesized speech of claim 10, wherein the home automation device is configured to:
determine that the synthesized speech of the text-based message was not heard; and
in response to determining that the synthesized speech of the text-based message was not heard by the recipient, cause an acknowledgment of the text-based message not having been heard to be transmitted to the electronic address linked with the sender via the home automation server system.

12. The system for providing the text-based message to the recipient as synthesized speech of claim 11, wherein determining that the synthesized speech of the text-based message was not heard is based on no vocalized acknowledgment of the text-based message having been heard being provided to the home automation device.

13. The system for providing the text-based message to the recipient as synthesized speech of claim 11, wherein determining that the synthesized speech of the text-based message was not heard is based on no motion having been detected by the home automation device within a time period of the text-based message having been output as the synthesized speech.

14. The system for providing the text-based message to the recipient as synthesized speech of claim 10, wherein the processor-readable instructions, when executed, further cause the one or more processors to:

determine that the synthesized speech of the text-based message was heard by the recipient; and
in response to determining that the synthesized speech of the text-based message was heard by the recipient, cause an acknowledgment of the text-based message having been heard to be transmitted to the electronic address linked with the sender.

15. The system for providing the text-based message to the recipient as synthesized speech of claim 10, wherein determining that the synthesized speech of the text-based message was heard by the recipient is based on the recipient providing a vocalized acknowledgment of the text-based message having been heard to the home automation device.

16. The system for providing the text-based message to the recipient as synthesized speech of claim 10, wherein determining that the synthesized speech of the text-based message was heard by the recipient is based on motion having been detected by the home automation device within a time period of the text-based message having been output as the synthesized speech.

17. The system for providing the text-based message to the recipient as synthesized speech of claim 10, wherein the processor-readable instructions that, when executed, cause the one or more processors to determine the home automation device linked with the designated vocalization destination comprise processor-readable instructions which, when executed, cause the one or more processors to:
determine a plurality of home automation devices linked with the designated vocalization destination; and
select the home automation device from the plurality of home automation devices based on motion being detected by the home automation device.

18. The system for providing the text-based message to the recipient as synthesized speech of claim 10, wherein the processor-readable instructions that, when executed, cause the one or more processors to determine the home automation device linked with the designated vocalization destination comprise processor-readable instructions which, when executed, cause the one or more processors to determine a plurality of home automation devices linked with the designated vocalization destination, the plurality of home automation devices comprising the home automation device; and the processor-readable instructions, when executed, further cause the one or more processors to:
cause multiple home automation devices of the plurality of home automation devices to output at least a portion of the text-based message as synthesized speech.

19. A non-transitory processor-readable medium comprising processor-readable instructions that cause one or more processors to:
receive a text-based message addressed to a designated vocalization destination from an electronic address associated with a sender;
filter the text-based message to determine that the text-based message is eligible for output as synthesized speech;
determine a home automation device linked with the designated vocalization destination; and
cause data corresponding to the text-based message addressed to the designated vocalization destination to be transmitted to the home automation device that causes the home automation device to output, via a speaker of the home automation device, at least a portion of the text-based message as synthesized speech.

* * * * *